(No Model.)
F. W. OSTROM.
POWER TRANSMITTER.
No. 366,504. Patented July 12, 1887.
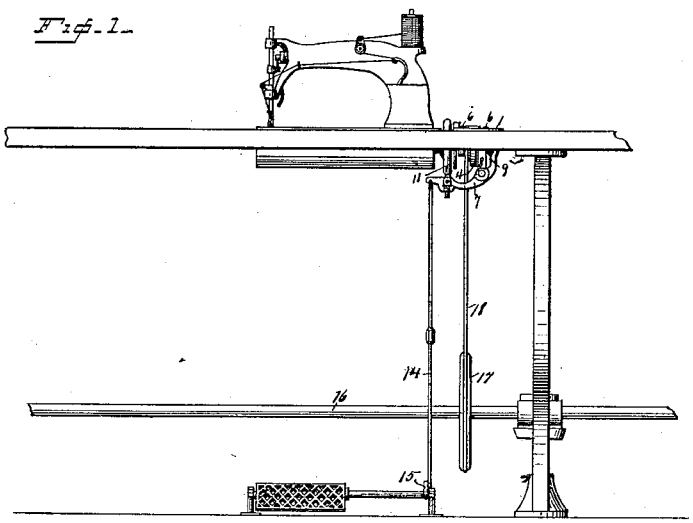
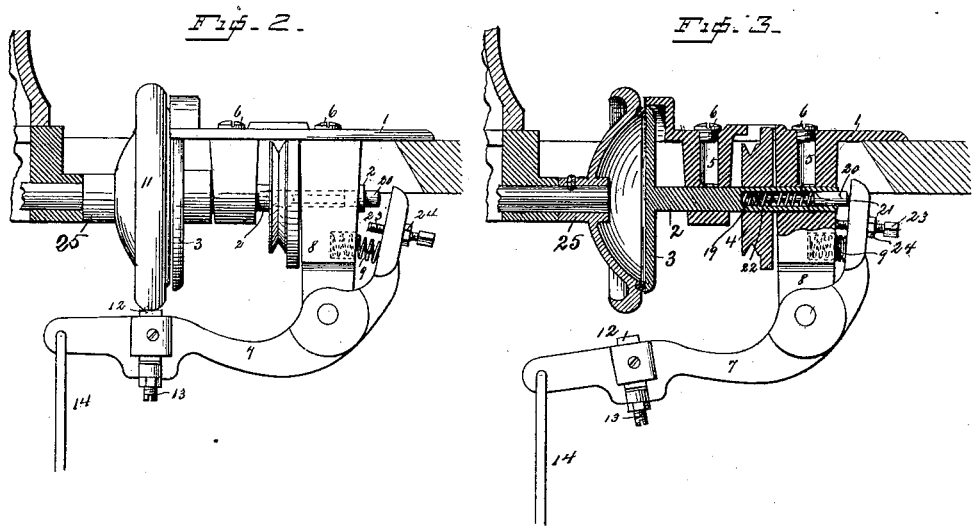
Witnesses
E. D. Smith
C. E. Ruggles
Inventor
Freeland W. Ostrom
By A. M. Wooster
Atty.

United States Patent Office.

FREELAND W. OSTROM, OF BRIDGEPORT, CONNECTICUT, ASSIGNOR TO THE WHEELER & WILSON MANUFACTURING COMPANY, OF SAME PLACE.

POWER-TRANSMITTER.

SPECIFICATION forming part of Letters Patent No. 366,504, dated July 12, 1887.

Application filed December 27, 1886. Serial No. 222,615. (No model.)

*To all whom it may concern:*

Be it known that I, FREELAND W. OSTROM, a citizen of the United States, residing at Bridgeport, in the county of Fairfield and State of Connecticut, have invented certain new and useful Improvements in Power-Transmitters; and I do hereby declare the following to be a full, clear, and exact description of the invention, such as will enable others skilled in the art to which it appertains to make and use the same.

My invention relates to that class of power-transmitters which is used in connection with a continuously-rotating shaft to transmit power to single machines—as, for example, sewing-machines—which it is not desired to keep continuously in operation, but to which power must be transmitted from the main shaft in such a manner that the machine can be quickly stopped or started, the transmission of power being under the complete control of the operator.

My invention has for its general objects to simplify the construction and greatly improve the operation of this class of devices.

In order that others may understand and use my invention, I will proceed to describe the same in connection with the accompanying drawings, forming part of this specification, which illustrate a simple and commonly-used arrangement, numbers being used to indicate the several parts.

Figure 1 is an elevation illustrating a manner in which my invention may be applied to a sewing-machine. Fig. 2 is an elevation upon an enlarged scale, the table being in section, showing the position of the parts when the transmitter is not in use; and Fig. 3 is a longitudinal section of the transmitter, partially in elevation, showing the details of construction, and showing the manner in which the power is transmitted to a machine.

1 denotes the frame-work or bracket of the transmitter, in which shaft 2 is journaled.

3 is a friction-disk, and 4 a belt pulley, both rigidly secured to shaft 2. The friction-disk and belt-pulley are so adjusted upon this shaft as to permit a certain amount of longitudinal motion of the shaft, for a purpose presently to be explained.

5 denotes oil-cups for the bearings of the shaft, which are closed by screw-caps 6.

7 denotes a lever pivoted to the bracket 1, as at 8. 9 is a spring recessed into said bracket, the outer end of which bears against the upper arm of the lever to throw the parts out of operative position, as in Fig. 2.

10 denotes the shaft, and 11 the driven disk or fly-wheel, of a machine—as, for example, a sewing-machine—to which power is to be applied. The lower arm of the lever is provided with a brake, 12, consisting, ordinarily, of a block of wood lying in a recess in said lever, and adjusted by a set-screw, 13. The device may be operated in any suitable manner, preferably by a treadle, as shown in Fig. 1.

14 is a rod extending from the end of the lower arm of the lever and connected to an arm, 15, upon the treadle-shaft.

16 is a power-shaft which is continually in motion, and is provided with any number of driving-wheels, 17, a belt, 18, connecting each driving-wheel with the belt-pulley 4 of the corresponding transmitter.

In manufacturing establishments where steam or other motive power is used, a number of machines are usually placed on a long table, all of which are run from a single shaft, a transmitter being used in connection with each machine. In practice I have found it a valuable improvement to bring the driving and driven disks in contact by a spring yielding pressure instead of by a pressure yielding only to the movement of the treadle. In order to accomplish this result, I provide shaft 2 with a longitudinal recess, 19. 20 is a plunger in this recess, having a shoulder, 21; and 22 is a spring bearing against said shoulder, the action of which is to force said plunger outward, as shown in Fig. 2. The outer end of the plunger projects a slight distance beyond the end of the shaft, and is engaged and forced inward by the upper arm of the lever when it is desired to transmit power to the machine.

The manner in which power is applied is clearly illustrated in Figs. 1 and 3, it being simply necessary to actuate the lever 7 in the proper direction—in the construction shown by pressing the foot upon the treadle—which draws down the lower arm of the lever, removing the brake from the fly-wheel of the machine, and, by means of the plunger and spring, forcing shaft 2 and the friction-disk toward the left, causing it to engage the fly-wheel of the machine. The instant the foot of the operator is removed from or reverses the treadle, spring 9 acts to force the upper arm of the lever to the position shown in Fig. 2, thus removing the pressure by which disk 3 is held in contact with the fly-wheel, and also throwing the brake against the periphery of the fly-wheel, so that the machine is almost instantaneously stopped.

By the application of a spring yielding pressure to disk 3 I am enabled to secure a positive variable speed. It is of course well understood that a certain pressure of disk 3 against the fly-wheel 11 will produce the greatest speed which the main shaft is capable of imparting to a machine when the transmitter is not connected to the shaft of the machine by a positive clutch, and that excess of pressure will reduce the speed of the machine, owing to the friction of the end of hub 25 against the contiguous bearing, and if extreme pressure is applied the friction will completely arrest the motion of the machine. Various materials have been used as washers between disk 3 and the fly-wheel, such as leather, felt, paper, and other fibrous materials. In the present instance a leather washer in the form of a piece of round belting is laid in a groove in the driven disk or fly-wheel, and is engaged by the driving-disk, as shown in Figs. 2 and 3. It will of course be understood that this arrangement may be inverted and the leather applied to the driving-disk, the function of the leather, in combination with the spring 22, being the same in either case. This washer is used to deaden the sound which might be produced from the engagement of two metal surfaces, and being a fibrous material it renders the disks less liable to slip when placed in engagement. The use of these washers, however, gives little, if any, yielding pressure, and very slight movement of the treadle or other actuating mechanism either forcibly engages or entirely separates the disk and the fly-wheel, thus rendering it difficult to apply the necessary amount of pressure to give to the machine its greatest amount of speed or to regulate the speed.

By the use of spring 22 and plunger 20, or any construction which gives a spring yielding pressure of disk 3 against the fly-wheel, I am enabled to retain control of the speed and avoid a pressure so great that the friction produced through resisting-bearings will retard the speed of the machine. In order that an adjustment at any desired speed may be retained, I have provided an adjusting-screw, 23, having a check-nut, 24, in the upper arm of lever 7. This screw is so arranged that the inner end comes in contact with bracket 1 at the instant lever 7 is in position to impart to disk 3 and the fly-wheel, through spring 22 and plunger 20, the necessary pressure to produce the desired speed. When adjusting-screw 23 is set in the proper position, it is locked there by the check-nut 24.

I claim—

1. The combination, with the driven disk or wheel, of a longitudinally-movable power-shaft, a rigid disk mounted thereon and driven thereby, a spring and lever whereby said friction-disk is thrown into operative position, said spring being interposed between the lever and movable shaft, whereby a yielding frictional contact is insured between the driven and driving disks, and a relatively-soft material—such as leather—interposed between the said parts, which engage by friction, and adapted to co-operate with the spring.

2. The movable shaft carrying a friction-pulley and having a longitudinal recess, in combination with a plunger within said recess, a spring in the recess bearing against the shaft in one direction and against the plunger in the other, and a lever adapted to bear against the plunger, whereby through said spring the driving and driven wheels may be brought together with a yielding pressure.

3. The movable shaft having a friction disk and a longitudinal recess, a plunger in said recess, and a spring in the recess interposed between the movable shaft and the plunger, in combination with a lever adapted to bear against the plunger and compress the spring, and a second spring, 9, bearing against the lever to return it to its normal position.

4. The combination, with the fly-wheel of a machine and a power-shaft, of a shaft, 2, having longitudinal movement and carrying a friction-disk, an operating-lever, 7, a spring and plunger between said lever and the shaft, and a set-screw in said lever, whereby its inward movement is stopped at the point necessary to secure any desired speed.

In testimony whereof I affix my signature in presence of two witnesses.

FREELAND W. OSTROM.

Witnesses:
A. C. SHATTUCK,
AUGUST W. BRUCK.